UNITED STATES PATENT OFFICE.

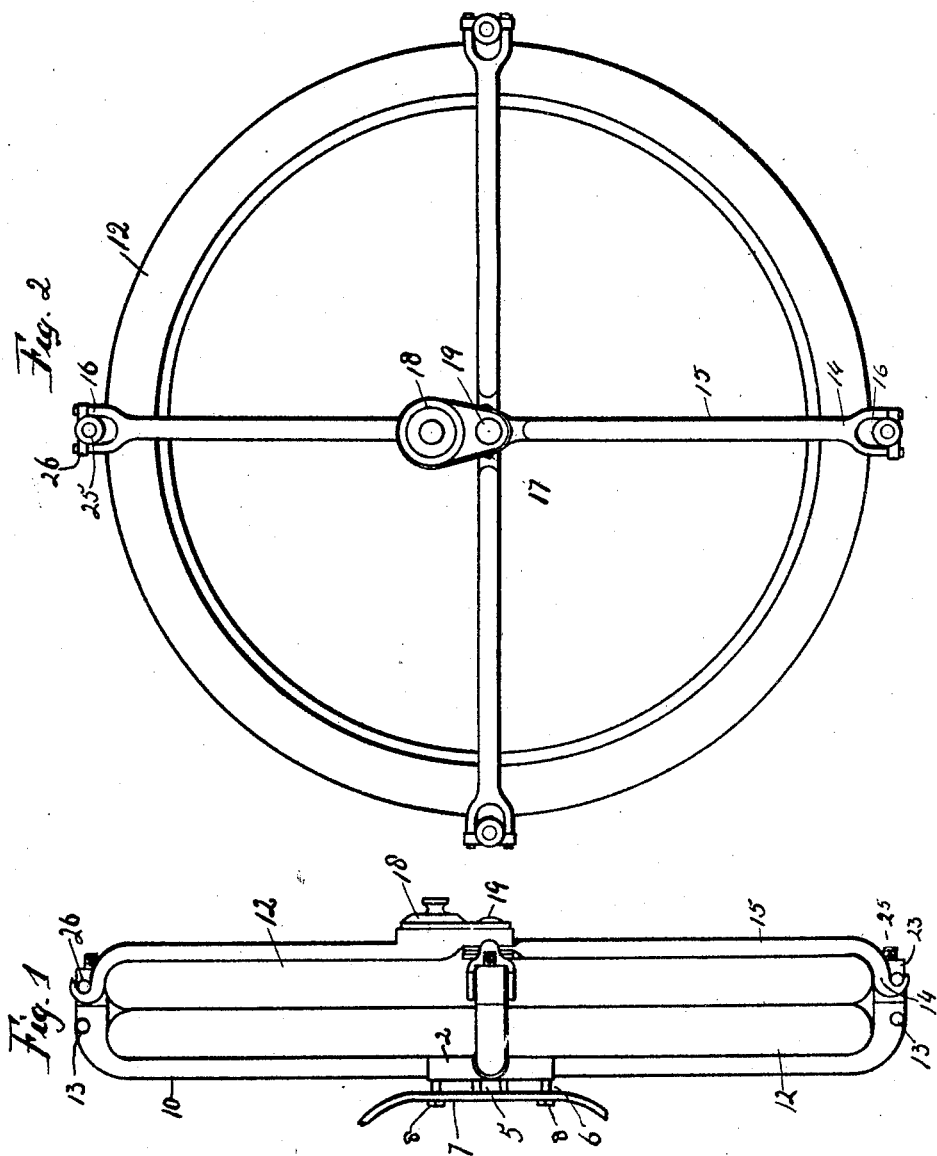

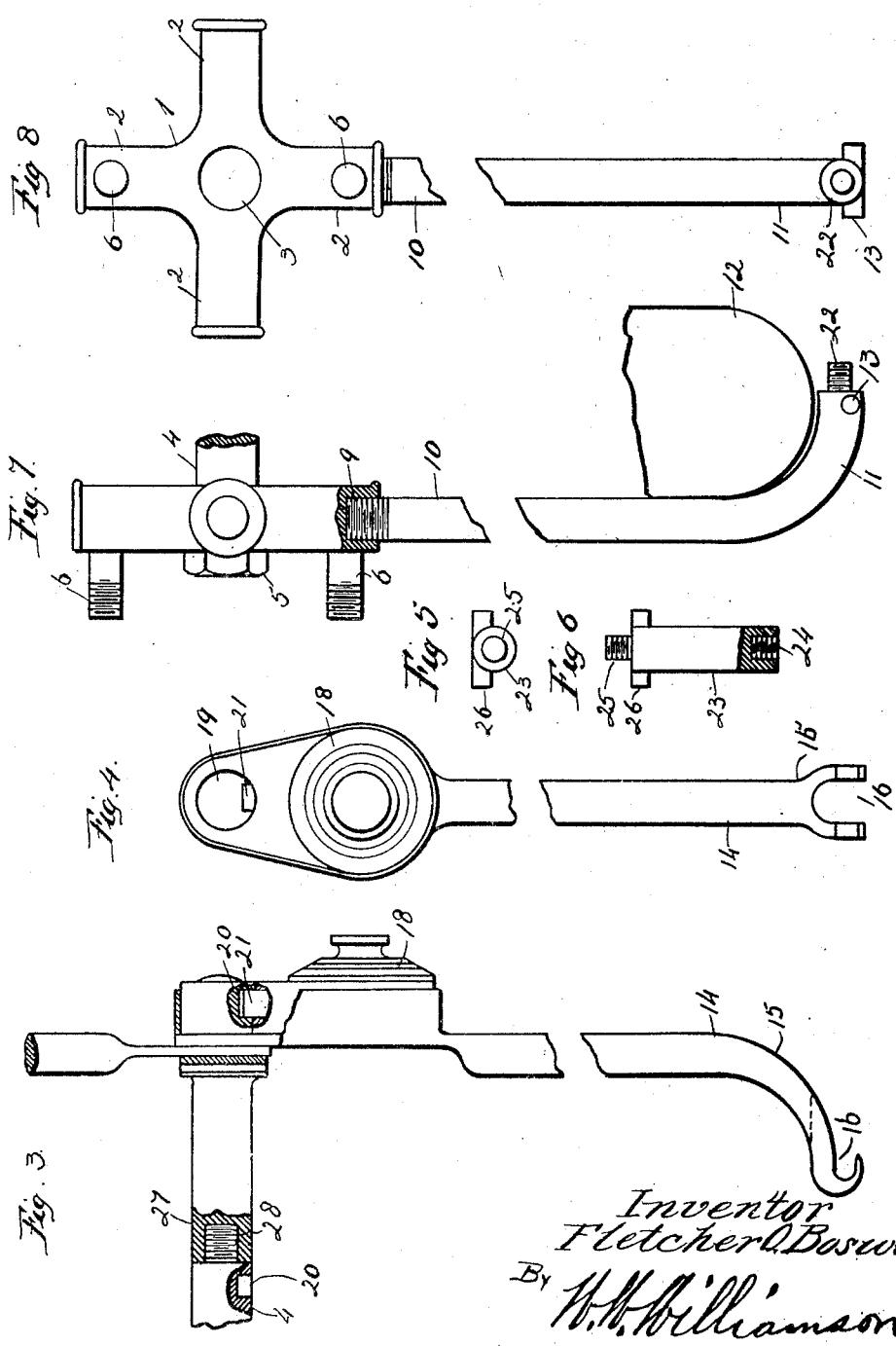

FLETCHER O. BOSWELL, OF PHILADELPHIA, PENNSYLVANIA, ASSIGNOR TO F. O. B. MANUFACTURING COMPANY, OF PHILADELPHIA, PENNSYLVANIA, A CORPORATION OF DELAWARE.

LOCK-UP TIRE-HOLDER FOR AUTOMOBILES.

1,359,483.  Specification of Letters Patent.  Patented Nov. 23, 1920.

Application filed July 21, 1919. Serial No. 312,409.

*To all whom it may concern:*

Be it known that I, FLETCHER O. BOSWELL, a citizen of the United States, residing at Philadelphia, in the county of Philadelphia and State of Pennsylvania, have invented new and useful Improvements in Lock-Up Tire-Holders for Automobiles, of which the following is a specification.

My invention relates to new and useful improvements in lock-up holders for automobile tires, and has for its object to provide a simple and effective device of this description, which may be secured to any convenient part of an automobile, and in which one or more tires may be placed and secured by combination lock in such manner that the tires are safe against removal by unauthorized persons.

A further object of my invention is to provide for the extension or enlargement of the holder, so as to accommodate the desired number of tires.

With these ends in view, this invention consists in the details of construction and combination of elements hereinafter set forth, and then specifically designated by the claims.

In order that those skilled in the art to which this invention appertains may understand how to make and use the same, I will describe its construction in detail, referring by numerals to the accompanying drawings forming a part of this application, in which:

Figure 1. is a side elevation of the rack or holder, made in accordance with my improvement, showing it extended sufficiently to hold two tires.

Fig. 2. is a front elevation of the rack showing the combination lock in position thereon, securing the automobile tire in place.

Fig. 3. is an enlarged fragmental view showing the combination lock in engagement with the central post, which serves to lock the swinging arms in place around the tires.

Fig. 4. is an enlarged front elevation of the swinging arm which carries the combination lock, said arm being partly broken away.

Fig. 5 is an end view of one of the extensions for increasing the tire holding capacity of the device.

Fig. 6 is a side elevation of Fig. 5, a portion being broken away to show the threaded hole in one end thereof.

Fig. 7 is a side elevation of the central section or hub of the device, showing one of the arms secured thereto, said arm being partially broken away.

Fig. 8 is a front view of Fig. 7.

In carrying out my invention as here embodied, 1 represents the central portion, or the hub, of the device, having the spokes 2, shown here, four in number, and a central hole 3 in which latter is fitted the central post 4, secured therein by the nut 5. 6 represents threaded studs projecting rearward from the arms of the hub, by means of which the device may be clamped to any convenient portion of the automobile as indicated at 7 by the nuts 8 being run around the ends of the studs.

Each of the spokes 2 radiating from the hub 1 is internally threaded, as indicated at 9 for the reception of the threaded ends of the arms 10, and when these arms are in place upon the hub, they form one section of the tire holding device since their outer ends are curved at 11 to conform to the general contour of the tire 12 which is to be held by the device.

Each of the curved ends of the arms 10 have the pins 13 projecting sidewise therefrom which pins serve as pintles for the hooked ends 14 of the swinging arms 15, said hooked ends being forked as indicated at 16, in order that they may embrace the curved ends of the arms 10, and thus form a secure and steady bearing for these swinging arms.

The swinging arms have their inner ends slotted or holes formed therein as indicated at 17, so as to pass over the end of the central post 4, one of these arms carrying the combination lock 18 the casing of which is also provided with an opening 19 for passage over the end of the central post 4, the latter having a recess 20 in the side thereof for the reception of the locking bolt 21 of the combination lock, so that when this bolt is shot into the recess the inner ends of all the swinging arms will be locked in place upon the central post, and cannot be removed without the unlocking of the lock and the retraction of the bolt 21.

Upon the outer ends of each of the arms 10 is formed a threaded stud 22, upon which the extension member 23 is adapted to be threaded said member having a threaded socket 24 for engagement with the stud 22, and each of these extension members is provided at the opposite end thereof with a threaded stud 25, for the purpose hereinafter set forth.

Pins 26 corresponding with pins 13 also project sidewise from the outer ends of the extension members 23.

An extension member 27 for the central post 4 is also provided and adapted to be secured upon the threaded stud 28 of the central post 4, and has a lock bolt recess 20 therein, similar in all respects and for the same purpose as the lock bolt recess 20 in the central post.

From the foregoing description, the operation of my improved tire holder will be obviously as follows:

Should the device be adjusted to hold two tires as here shown, these tires are set in place upon the radial arms 10 concentric with the hub, when the levers 15 are swung one by one upon their pintles 13, until their slotted ends pass over the central post extension 27, the bolt of the combination lock being shot into the recess 20 to lock up the tires within the stationary arms and the swinging arms so that they cannot be removed except by the unlocking of the combination lock.

When it is desired that the device shall hold a single tire, the extension arms 23 are threaded from off the studs 22, and the extension member 27 is threaded from off the stud 28, when the hooked ends of the swinging levers may be engaged with the pintle pins 13 on the arms 10, thereby reducing the space between the said arms and the swinging arms to accommodate a single tire, as will be readily understood.

By this arrangement it is possible to hold and lock up any desired number of tires, by continuing to add extension members to the radial arms and to the central post, each of which series of added extension members providing for the accommodation of an additional tire.

The combination lock may either be secured permanently to one of the swinging arms or it may remain independent of said arms, as its locking up function would not be affected in either case.

Of course I do not wish to be limited to the exact details of construction as herein shown, as these may be varied within the limits of the appended claims without departing from the spirit of my invention.

Having thus fully described my invention, what I claim as new and useful is:

1. In an automobile tire holder, a hub, means for securing said hub to the automobile, spokes radiating from the hub, arms attached to said spokes, the outer ends of said arms being curved to conform to the general contour of the cross section of the tire, pintles carried by the outer ends of said arms, a post projecting from the center of the hub said post having a lock bolt recess therein, swinging arms having forked ends for engagement with said pintles, the inner end of each of said arms adapted to swing over the central post, and a combination lock also adapted to pass over said post, the bolt of said lock to be adapted to be shot into the said recess.

2. In an automobile tire holder a hub, means for securing said hub to the automobile, a post projecting from the center of said hub, an extension member adapted to be secured to said post, said extension member having a bolt keeper recess therein, spokes radiating from the hub, arms attached to said spokes, the outer ends of said arms being curved to conform to the general contour of the cross section of the tire, extension members adapted to be secured to the outer ends of said arms, pintles carried by the extension members, swinging arms having their outer ends forked and hooked for engagement with the pintles, their inner ends having openings therein for passing over the central extension member, and a lock the bolt of which is adapted to engage the said keeper recess for holding the swinging arms in their closed position.

3. A tire holder comprising in combination a hub, a central post having a recess projecting from said hub, a series of arms radiating from said hub, said arms having their outer ends curved for the reception of a tire, a series of swinging arms pivotally and demountably connected to the outer ends of the radial arms and having openings for registration with the central post, and a lock carried by one of said swinging arms, the bolt of which registers with the recess in the post for locking all of said arms in their adjusted positions.

In testimony whereof I have hereunto affixed my signature.

FLETCHER O. BOSWELL.